United States Patent
Yu

(10) Patent No.: US 12,391,418 B2
(45) Date of Patent: Aug. 19, 2025

(54) STRAP-CUTTING MECHANISM FOR STRAPPING DEVICE

(71) Applicant: Yang Bey Industrial Co., Ltd., Taichung (TW)

(72) Inventor: Teng-Chi Yu, Taichung (TW)

(*) Notice: Subject to any disclaimer, the term of this patent is extended or adjusted under 35 U.S.C. 154(b) by 224 days.

(21) Appl. No.: 18/233,886

(22) Filed: Aug. 15, 2023

(65) Prior Publication Data
US 2024/0367831 A1 Nov. 7, 2024

(30) Foreign Application Priority Data
May 2, 2023 (TW) .................. 112116309

(51) Int. Cl.
| B65B 13/16 | (2006.01) |
| B23D 29/00 | (2006.01) |
| B23D 33/02 | (2006.01) |
| B65B 13/02 | (2006.01) |

(52) U.S. Cl.
CPC ............ B65B 13/16 (2013.01); B23D 29/002 (2013.01); B23D 33/02 (2013.01); B65B 13/025 (2013.01)

(58) Field of Classification Search
CPC ..... B65B 13/16; B65B 13/025; B23D 29/002; B23D 33/02
See application file for complete search history.

(56) References Cited

U.S. PATENT DOCUMENTS

| 4,252,158 | A | * | 2/1981 | McDade | B65B 13/025 140/93.2 |
| 4,326,334 | A | * | 4/1982 | Roux | B26B 17/00 30/124 |
| 5,457,889 | A | * | 10/1995 | Kimura | B23D 15/14 83/605 |
| 6,308,760 | B1 | * | 10/2001 | Finzo | B65B 13/025 100/33 PB |
| 6,928,788 | B1 | * | 8/2005 | Lai | B65B 51/08 53/138.8 |
| 10,040,585 | B1 | * | 8/2018 | Yu Chen | B65B 13/025 |
| 10,414,526 | B2 | * | 9/2019 | Yu Chen | B65B 13/305 |
| 11,225,344 | B2 | * | 1/2022 | Shindou | B65B 13/06 |
| 2005/0284534 | A1 | * | 12/2005 | Yu Chen | B65B 13/025 140/123.6 |
| 2007/0169833 | A1 | * | 7/2007 | Crittenden | B65B 13/025 140/123.6 |
| 2015/0321776 | A1 | * | 11/2015 | Nelson | B65B 13/025 53/399 |

(Continued)

*Primary Examiner* — Omar Flores Sanchez
(74) *Attorney, Agent, or Firm* — Bruce Stone LLP; Joseph A. Bruce

(57) ABSTRACT

A strap-cutting mechanism for a strapping device includes a strap-cutting head that has a through hole and clamping members. The through hole receives a knife sleeve extending therethrough. The clamping members are separated so that plates and a spacer arranged therebetween. The spacer is arranged between the plates so that a gap is formed between the plates for a packing strap to pass therethrough. The gap guides the packing strap so that a smooth strapping process can be ensured. An alternative spacer of a different thickness may be used to adjust the gap formed between the plates. This allows the plates and/or the spacer when become damaged or deformed after long use to be easily replaced, thereby extending the service life of the strapping device.

5 Claims, 5 Drawing Sheets

(56) References Cited

U.S. PATENT DOCUMENTS

| | | | |
|---|---|---|---|
| 2015/0344160 A1* | 12/2015 | Yu Chen | B65B 13/22 |
| | | | 53/582 |
| 2015/0353217 A1* | 12/2015 | Yu Chen | B65B 61/08 |
| | | | 100/6 |
| 2017/0361957 A1* | 12/2017 | Takemura | B65B 13/025 |
| 2018/0327123 A1* | 11/2018 | Aarts | B65B 27/105 |
| 2020/0391891 A1* | 12/2020 | Xu | B65B 13/16 |
| 2023/0118858 A1* | 4/2023 | Itagaki | B65B 13/185 |
| | | | 53/399 |
| 2023/0312155 A1* | 10/2023 | Song | B65B 69/0025 |
| | | | 53/492 |
| 2023/0406558 A1* | 12/2023 | Matsushima | B65B 13/025 |
| 2024/0051694 A1* | 2/2024 | Schmid | B65B 13/325 |
| 2024/0359841 A1* | 10/2024 | Kobayashi | B65B 13/185 |
| 2024/0367830 A1* | 11/2024 | Yu | B65B 13/025 |

\* cited by examiner ness, thickness, and width of the packing strap 200. When the alternative spacer 29 is thicker, the gap 282 is wider. When the alternative spacer 29 is thinner, the gap 282 is narrower. By selecting a proper spacer 29 from spacers of different thicknesses, the gap 282 can be adjusted to fit various sizes of packing straps 200.

STRAP-CUTTING MECHANISM FOR STRAPPING DEVICE

BACKGROUND OF THE INVENTION

1. Technical Field

The present invention relates to a strap-cutting mechanism, and more particularly to a strap-cutting mechanism for a strapping device.

2. Description of Related Art

To pack a package with a packing strap for transportation, the conventional practice is to put the packing strap around the package and then use a manual strapping device or a power strapping device to tighten and seal the packing strap. Such a strapping device typically comprises a main body, which holds a strap-cutting component and a take-up component. The strap-cutting component comprises a knife sleeve and a knife shaft. The knife sleeve is formed with a pair of strap-holding slits for a packing strap to pass therethrough. The knife shaft is received in the knife sleeve. The knife shaft has one end equipped with a handle. In use, after the packing strap with a metal seal is put around an object, the packing strap is drawn to pass the knife sleeve and then tensioned by take-up component. At last, the user can operate the handle to rotate the knife shaft to thereby cut the packing strap, thereby finishing the strapping process.

After repeated use, the strapping device tends to see damage and/or deformation at its knife sleeve, strap-holding slits, and knife shaft. It is thus desired to have components of a strapping device designed as separate parts that are easy to repair and/or replace. Hence, the inventor of the present invention has devised the subject matter of the present invention to improve the foregoing and other existing strapping devices.

SUMMARY OF THE INVENTION

The primary objective of the present invention is to provide a strap-cutting mechanism for a strapping device that is easy to adjust, maintain, and repair.

In order to achieve the foregoing objective, the present invention provides a strap-cutting mechanism for a strapping device that has a main body comprising a strap-cutting mechanism and a take-up component, wherein the strap-cutting mechanism comprises: a strap-cutting head, having a through hole and a pair of clamping members, the strap-cutting head being attached to the main body, the through hole receiving a knife sleeve extending therethrough, the knife sleeve having an extension that juts out of the strap-cutting head, the extension being formed with a pair of strap-holding slits, the clamping members being separated so that a pair of plates and a spacer are arranged therebetween, the plates each having an extension that juts out of the strap-cutting head, and the spacer being arranged between the plates so that a gap that is communicated with the strap-holding slits is formed between the extensions of the plates.

In the present invention, with the gap formed between the plates in virtue of the spacer, a smooth strapping process can be ensured. Additionally, an alternative spacer of a different thickness may be used to adjust the gap formed between the plates. This design also allows the plates and/or the spacer that get damaged or deformed after long use of the strapping device to be easily replaced, thereby extending the service life of the strapping device.

DETAILED DESCRIPTION OF THE INVENTION

Figure 1:
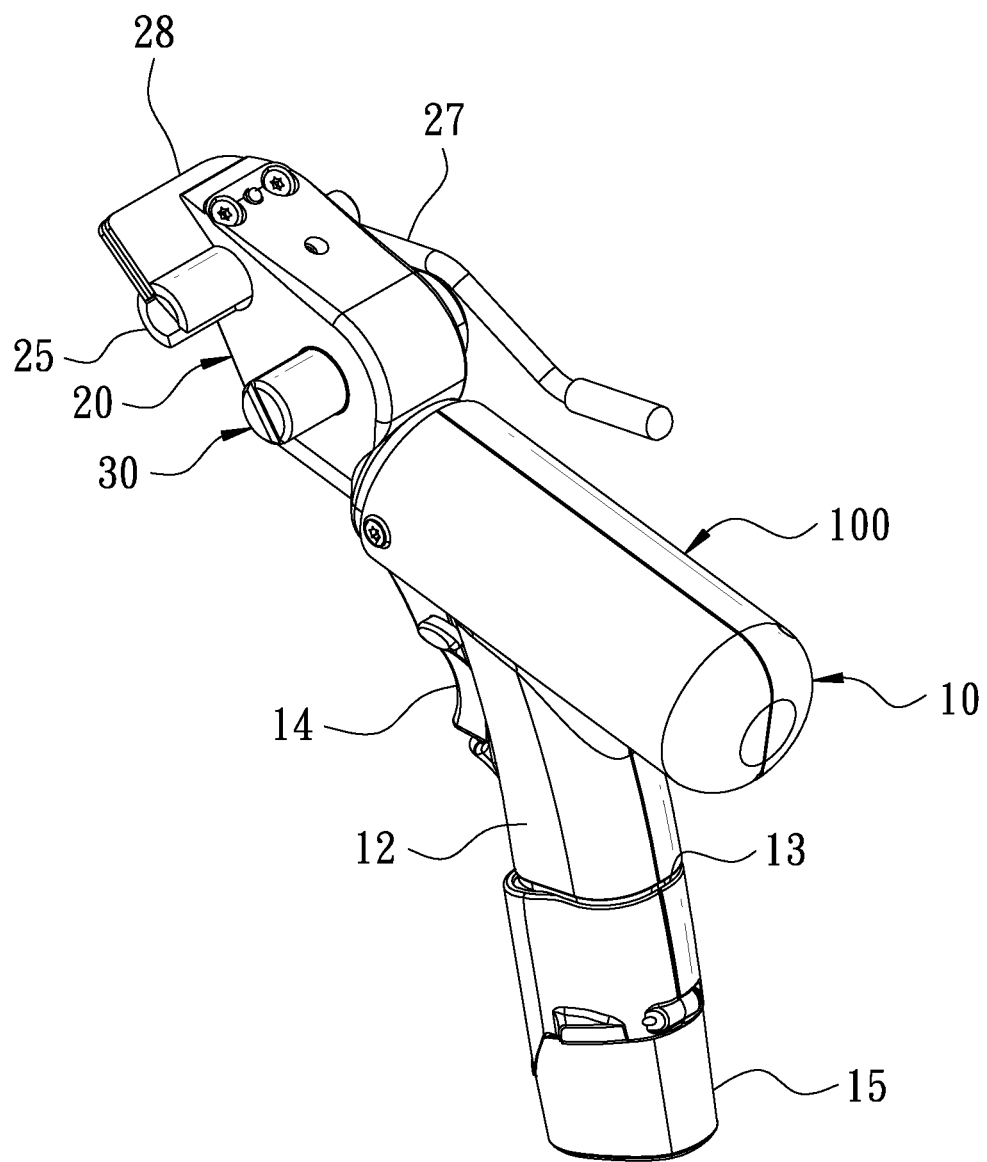
FIG. 1 is a perspective view of a preferred embodiment of the present invention.
Figure 2:
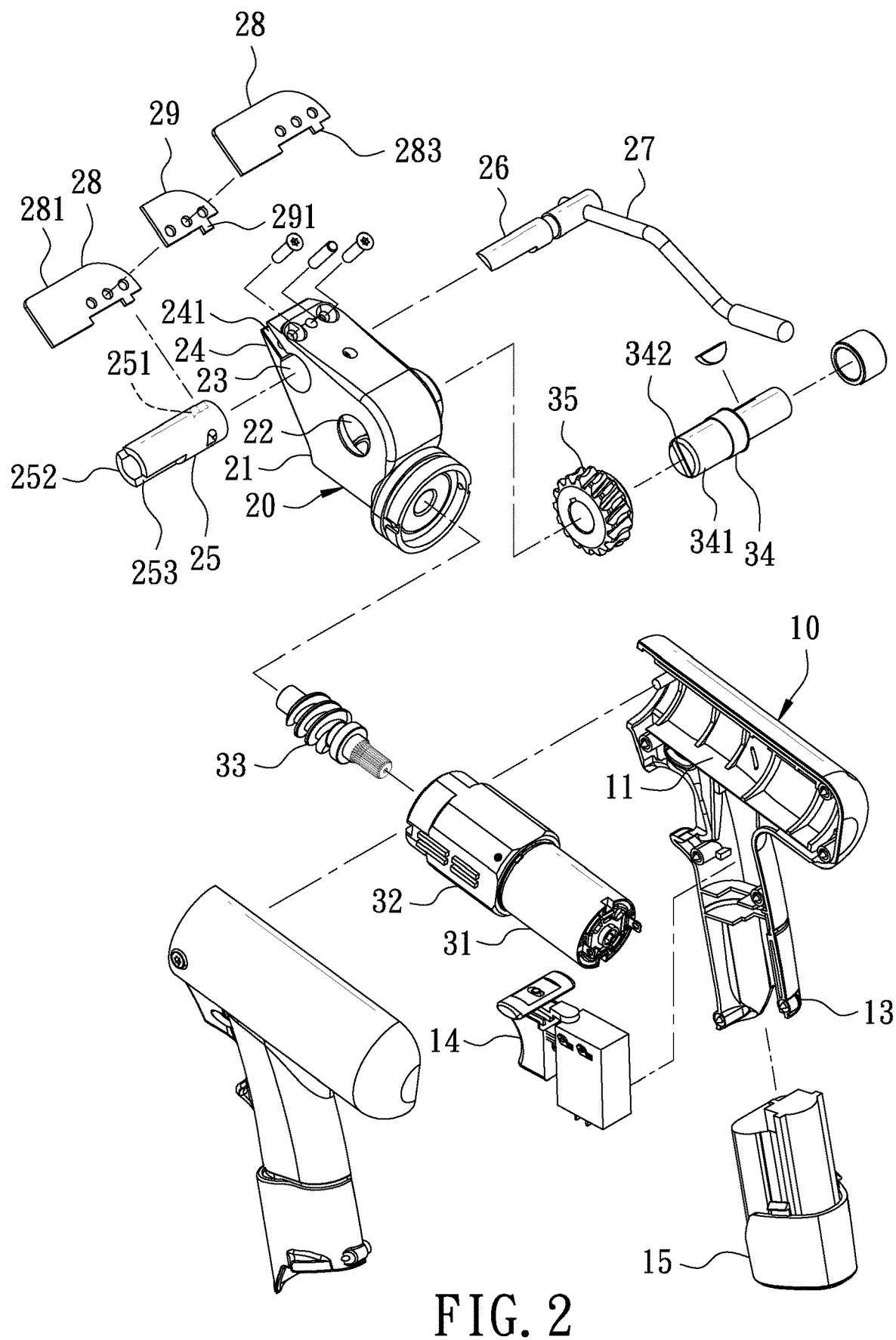
FIG. 2 is an exploded view of the preferred embodiment of the present invention.

FIG. 1 and FIG. 2 are a perspective view and an exploded view of a preferred embodiment of the present invention, respectively. As shown, a strap-cutting mechanism is applied to a strapping device 100, which is herein a hand-held power strapping device and has a main body 10 in addition to the strap-cutting mechanism 20.

The main body 10 is partially hollow to define therein a first accommodating space 11. The main body 10 has a grip 12 and a power section 13. The grip 12 is provided with a button 14. The power section 13 is configured to hold a power source 15, which is herein a battery. The button 14 and the power source 15 are electrically connected to each other.

The strap-cutting mechanism 20 comprises a strap-cutting head 21. The strap-cutting head 21 defines therein a second accommodating space 22, is formed with a through hole 23, and has a pair of clamping members 24. The strap-cutting head 21 is attached to the main body 10, so that the first accommodating space 11 and the second accommodating space 22 are communicated with each other. The through hole 23 is for receiving a knife sleeve 25 that extends therethrough. The knife sleeve 25 is formed with a positioning recess 251. The knife sleeve 25 has an extension 252 jutting out of the strap-cutting head 21. The extension 252 is formed with a pair of strap-holding slits 253. The strap-holding slits 253 are configured for a packing strap 200 to pass therethrough. The knife sleeve 25 may receive a knife shaft 26 or not. The knife shaft 26 has a fixed end, which is radically fixedly connected to a handle 27. The handle 27 when being operated drives the knife shaft 26 to rotate, thereby cutting the packing strap 200. The clamping members 24 have their respective inner sides that face each other jointly defining a mouth 241 therebetween. The mouth 241 and the through hole 23 are communicated with each other. The clamping members 24 are connected together by a plurality of screws, and have a pair of plates 28 and a spacer 29 arranged therebetween. The plates 28 may be blades. The plates 28 each have an extension 281 jutting out of the strap-cutting head 21. Each of the extensions 281 has a part positioned in one of the strap-holding slits 253. The spacer 29 is located between the plates 28. A gap 282 is formed between the extensions 281 of the plates 28 and communicated with the strap-holding slits 253, so that the packing strap 200 can pass through the gap 282, as shown in FIG. 3.

The plates 28 and the spacer 29 each have a positioning salient 283 or 291. The positioning salients 283, 291 are positioned in the positioning recess 251.

The strapping device 100 further has a take-up component 30, which comprises a motor 31, a reduction gear set 32 or a planetary gear set, a worm 33, and a take-up roller 34. The motor 31 is electrically connected to the button 14 and the power source 15. The motor 31, the reduction gear set 32, and the worm 33 are connected to each other. The motor 31 and the reduction gear set 32 are installed in the first accommodating space 11, and the take-up roller 34 is installed in the second accommodating space 22. A worm gear 35 mounted around the take-up roller 34 is engaged with the worm 33. Therein, the take-up roller 34 has an extension 341 jutting out of the strap-cutting head 21. The extension 341 of the take-up roller 34 is formed with a strap-holding slits 342 for the packing strap 200 to pass therethrough. Thereby, when the button 14 is pressed, the motor 31 drives the reduction gear set 32, the worm 33, the worm gear 35, and the take-up roller 34 to make the take-up roller 34 rotate and tension the packing strap 200.

Figure 3:
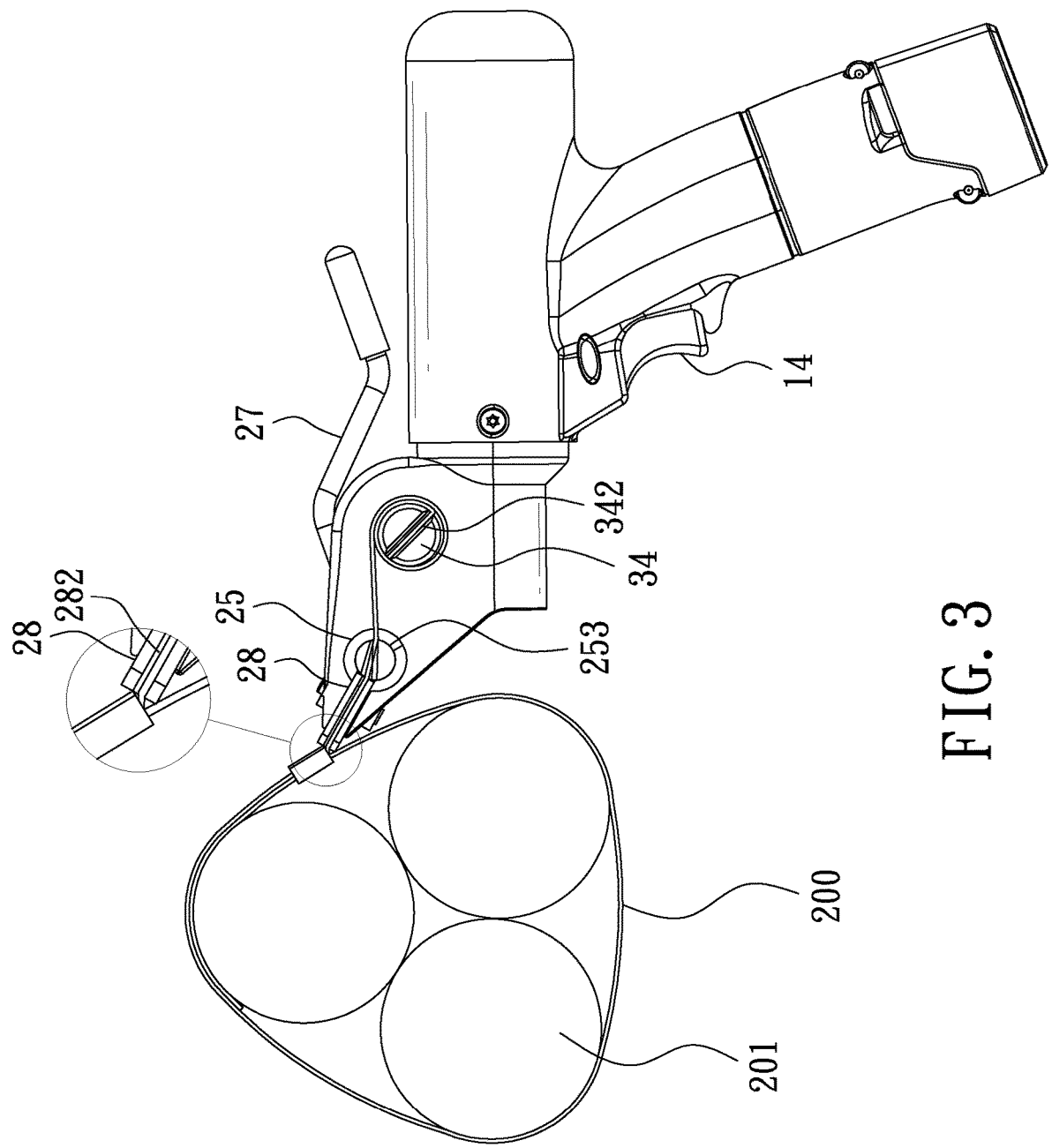
FIG. 3 is an applied view of the preferred embodiment of the present invention, wherein the device is taking up a packing strap.
Figure 4:
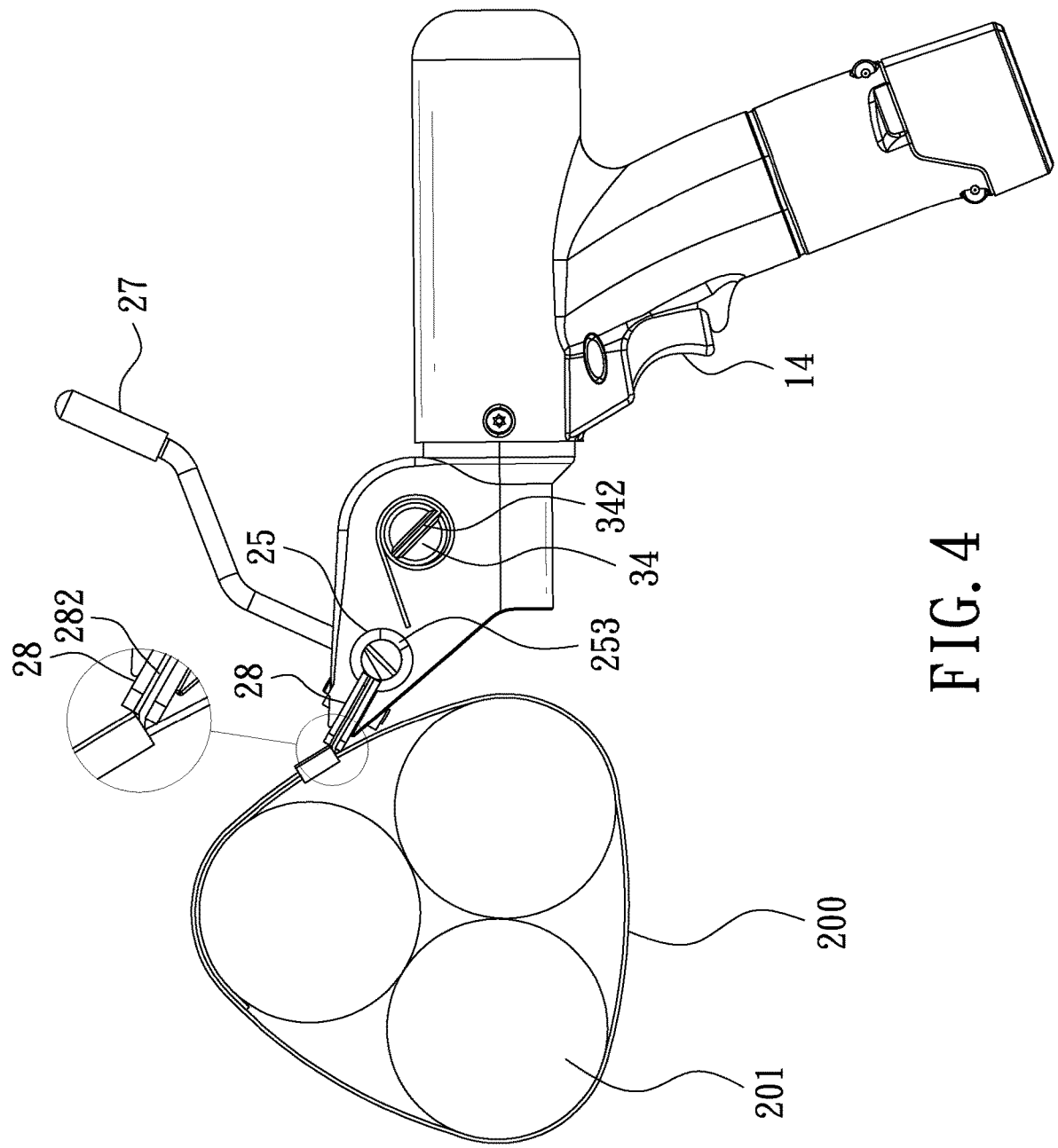
FIG. 4 is another applied view of the preferred embodiment of the present invention, wherein the device is cutting the packing strap.

Referring to FIG. 3, in use of the strapping device 100, a packing strap 200, which is a metal strap with a metal seal, is put around an object 201, so that the plates 28 press against the metal seal. Then the packing strap 200 is drawn to pass between the plates 28, and pass the strap-holding slits 253 of the knife sleeve 25 and the strap-holding slits 342 of the take-up roller 34, successively. Afterward, the button 14 is pressed to make the take-up roller 34 take the strap up, thereby tensioning the packing strap 200. At last, the handle 27 is operated to drive the knife shaft 26 to rotate and cut the packing strap 200, so as to finishing the strapping operation, as shown in FIG. 4.

In the present invention, with the gap 282 formed between the plates 28 in virtue of the spacer 29 for the packing strap 200 to pass therethrough, the packing strap 200 is well guided and the risk of curl or twist can be eliminated, thereby ensuring a smooth strapping process. Additionally, since the plates 28 and the spacer 29 are fixed to the strap-cutting head 21 through the screws, an alternative spacer 29 of a different thickness may be used to adjust the gap 282 formed between the plates 28. This design also allows the plates 28 and/or the spacer 29 that get damaged or deformed after long use of the strapping device 100 to be easily replaced, thereby extending the service life of the strapping device 100.

Figure 5:
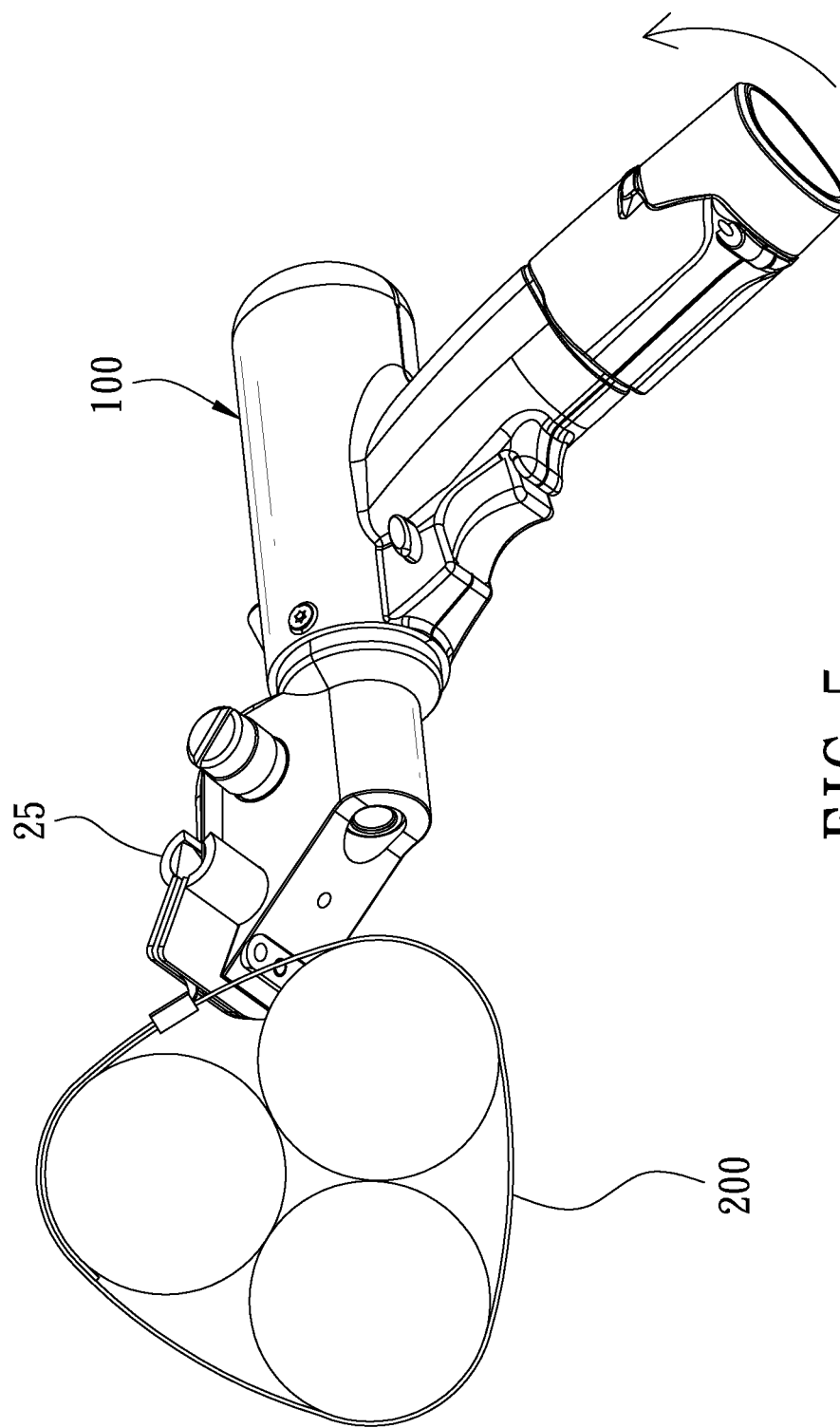
FIG. 5 is another applied view of the preferred embodiment of the present invention, wherein the device is tearing the packing strap.

Referring to FIG. 5, the present invention may be implemented without the knife shaft in the knife sleeve 25. In this case, after the packing strap 200 is put around an object and tensioned in the way described previously, the strapping device 100 can be torn against the plates 28, so that the plates 28 help break the packing strap 200, thereby finishing the strapping process.

What is claimed is:

1. A strap-cutting mechanism for a strapping device that has a main body comprising a strap-cutting mechanism and a take-up component, wherein the strap-cutting mechanism comprises:
a strap-cutting head, having a through hole and a pair of clamping members, the strap-cutting head being attached to the main body, the through hole receiving a knife sleeve extending therethrough, the knife sleeve having an extension that juts out of the strap-cutting head, the extension being formed with a pair of strap-holding slits, the clamping members being separated so that a pair of plates and a spacer are arranged therebetween, the plates each having an extension that juts out of the strap-cutting head, and the spacer being arranged between the plates so that a gap that is communicated with the strap-holding slits is formed between the extensions of the plates.

2. The strap-cutting mechanism of claim 1, wherein the knife sleeve is formed with a positioning recess, while the plates and the spacer each have a positioning salient, so that the positioning salient of the plates and the positioning salient of the spacer are positioned in the positioning recess.

3. The strap-cutting mechanism of claim 1, wherein the knife sleeve receives a knife shaft, and a handle is fixedly connected to one end of the knife shaft, so that when the handle is operated, the handle drives the knife shaft to rotate.

4. The strap-cutting mechanism of claim 1, wherein the plates are blades.

5. The strap-cutting mechanism of claim 1, wherein the clamping members have respective inner sides thereof that face each other jointly defining a mouth therebetween, and the mouth and the through hole are communicated with each other.

* * * * *